United States Patent
Wilke et al.

(10) Patent No.: US 8,770,350 B2
(45) Date of Patent: Jul. 8, 2014

(54) ACCESS CONTROL SYSTEM AND ACCESS CONTROL METHOD FOR A PEOPLE CONVEYOR CONTROL SYSTEM

(75) Inventors: Michael Wilke, Berlin (DE); Martin Georg Walter Hnida, Teltow (DE); Hans-Killan Spielbauer, Berlin (DJ); Donald F. Cominelli, Berlin (DJ)

(73) Assignee: Otis Elevator Company, Farmington, CT (US)

( * ) Notice: Subject to any disclaimer, the term of this patent is extended or adjusted under 35 U.S.C. 154(b) by 448 days.

(21) Appl. No.: 13/140,536

(22) PCT Filed: Dec. 18, 2008

(86) PCT No.: PCT/EP2008/010846
§ 371 (c)(1),
(2), (4) Date: Jun. 17, 2011

(87) PCT Pub. No.: WO2010/069347
PCT Pub. Date: Jun. 24, 2010

(65) Prior Publication Data
US 2011/0247901 A1    Oct. 13, 2011

(51) Int. Cl.
*B66B 1/20* (2006.01)

(52) U.S. Cl.
USPC .......................................... 187/384; 187/247

(58) Field of Classification Search
USPC .......... 187/247, 380–388, 391–393, 396, 399
See application file for complete search history.

(56) References Cited

U.S. PATENT DOCUMENTS

| | | | |
|---|---|---|---|
| 5,007,506 A * | 4/1991 | Suzuki et al. | 187/247 |
| 5,616,894 A | 4/1997 | Nieminen et al. | |
| 5,736,692 A * | 4/1998 | Lumme et al. | 187/247 |
| 6,330,935 B1 * | 12/2001 | Systermans | 187/391 |
| 6,425,460 B2 * | 7/2002 | Schuster | 187/247 |
| 6,707,374 B1 * | 3/2004 | Zaharia | 340/5.31 |
| 6,721,889 B1 | 4/2004 | Jaegtnes et al. | |

(Continued)

FOREIGN PATENT DOCUMENTS

| | | |
|---|---|---|
| EP | 1900672 A1 | 3/2008 |
| JP | 2002060156 A | 2/2002 |
| JP | 2002356281 A | 12/2002 |
| RU | 2310597 C2 | 11/2007 |

OTHER PUBLICATIONS

International Search Report and Written Opinion of the International Searching Authority for International application No. PCT/EP2008/010846 mailed Sep. 2, 2009.

(Continued)

*Primary Examiner* — Anthony Salata
(74) *Attorney, Agent, or Firm* — Carlson, Gaskey & Olds

(57) ABSTRACT

An access control system for a people conveyor control system, includes an authentication proving device adapted to communicate with a people conveyor control system. The authentication proving device has a central processor unit and a read protected memory protected from read and write access by external applications. The authentication proving device stores in its read protected memory program code to carry out a verification procedure in response to a verification request from the people conveyor control system, and sends a verification signal to the people conveyor control system. The people conveyor control system in response to the verification signal selectively allows or denies access to at least one of specific sections of said people conveyor control system or specific functions implemented in the people conveyor control system.

17 Claims, 4 Drawing Sheets

(56) References Cited

U.S. PATENT DOCUMENTS

| | | | |
|---|---|---|---|
| 7,073,633 B2* | 7/2006 | Weinberger et al. | 187/393 |
| 7,145,433 B2* | 12/2006 | Gerstenkorn | 340/5.22 |
| 7,172,055 B2* | 2/2007 | Engel et al. | 187/391 |
| 7,500,544 B2* | 3/2009 | Hakala et al. | 187/382 |
| 8,028,807 B2* | 10/2011 | Deplazes et al. | 187/391 |
| 8,061,485 B2* | 11/2011 | Finschi | 187/384 |
| 8,381,880 B2* | 2/2013 | Finschi | 187/388 |
| 8,464,840 B2* | 6/2013 | Flynn et al. | 187/384 |
| 8,499,895 B2* | 8/2013 | Zweig | 187/387 |
| 2008/0062981 A1 | 3/2008 | Gerstenkorn | |

OTHER PUBLICATIONS

State Intellectual Property Office of People's Republic China, Search Report for Application No. 20880132472.5, dated Apr. 17, 2013.

International Preliminary Report on Patentability for International application No. PCT/EP2008/010846 mailed Jul. 4, 2011.

* cited by examiner

ACCESS CONTROL SYSTEM AND ACCESS CONTROL METHOD FOR A PEOPLE CONVEYOR CONTROL SYSTEM

The present invention relates to an access control system for a people conveyor control system, and to an access control method for a people conveyor control system.

Nowadays operation of people conveyors like elevators, escalators or moving walkways is typically controlled by an electronic control system comprising at least one microcontroller, but usually several microcontrollers in communication with each other and controlled by a main controller, and the corresponding periphery like RAM/ROM memories, interfaces, I/O devices, bus systems, etc. Maintenance of such people conveyor control systems typically requires to carry out specific procedures, and therefore interaction with, and manipulation of, the conveyor control system. More and more for carrying out maintenance operations, external maintenance tools are used which communicate with the conveyor control system via suitable connectors, and access the people conveyor control system from outside to perform various maintenance routines and manipulate operation parameters stored in the conveyor control system. External maintenance tools often are PC based computer devices, e.g. laptop computers or palms.

It is a strong desire to restrict access to the conveyor control system for maintenance purposes to qualified and authorized personnel only, and moreover for specifically dedicated maintenance routines only. Maintenance usually requires the access to proprietary operational data of the conveyor control system, and the manipulation of such data, with the result that maintenance not only requires read access to the conveyor control system, but both read and write access. Maintenance further often requires to carry out very special operation procedures (e.g test runs of the conveyor at specific speeds and in specific moving patterns for calibrating new devices or testing performance of critical devices like brakes). Clearly such operation procedures are to be kept strictly non-accessible to non-authorized users.

Passwords can be used for restricting grant of access to the conveyor control system, at least with respect to those functions and/or data relevant for maintenance (in the following such data/functions will also be called maintenance data/functions). However, passwords, on the one hand, are inconvenient, since the passwords have to be assigned to the specific conveyor installations, respectively, and the service persons have to remember the passwords to be used for a specific installation. This restricts the number of password that can be used and requires the use of simple, probably non-unique passwords that cannot be changed easily. It will be comparatively easy to find out these passwords, and therefore only poor protection of the proprietary control software can be achieved. Alternatively, more complicated passwords or even encryption keys could be used. For efficiency purposes such passwords/encryption keys would have to be stored in some form in connection with the external tools. Such approach, however, leads to severe data safety problems, because owing to the external tools being PC based devices, it is not too difficult for unauthorized persons to read out such passwords/encryption keys from the external tool's memory. Similar problems apply to any encryption approaches as long as a key is to be stored in a PC based external device.

It is known to grant access to an elevator control system by use of memory cards that are to be inserted into a corresponding slot provided somewhere at the elevator (e.g. at a control panel), see e.g EP 0 615 945 A1. Inserting a memory card storing information on maintenance procedures to be carried out, and relevant parameters, allows to read the relevant data for carrying out a maintenance operation from the memory card into the elevator control system, and therefore a control of maintenance procedures can be effected by simply handing out to a service person the memory card required for providing desired maintenance operations at a specific elevator installation. However, in case the memory card gets lost, the data thereon will enable any person to have access to the elevator control. Moreover, meanwhile efficient procedures exist by which the data structures on such memory cards can be read out by unauthorized persons.

It would be beneficial to have an improved possibility of preventing unauthorized access to the control system of a people conveyor. It would be particularly beneficial if such prevention of unauthorized access would be more secure, but nevertheless not involve significantly more efforts in practical use.

An exemplary embodiment of the invention provides an access control system for a people conveyor control system, comprising an authentication proving device adapted to communicate—directly or indirectly via at least one further device—with a people conveyor control system, said authentication proving device having a central processor unit (CPU) and a read protected memory being protected from read and write access by external applications, said authentication proving device storing in its read protected memory program code to carry out a verification procedure in response to a verification request from said people conveyor control system, and to send a verification signal to said people conveyor control system, said people conveyor control system in response to receipt of said verification signal selectively allowing or denying access to specific sections of said people conveyor control system and/or to specific functions implemented in said people conveyor control system.

Another exemplary embodiment provides a method for controlling access to a people conveyor control system, comprising the steps of providing an authentication proving device having a central processor unit CPU and a read protected memory being protected from read and write access by external applications; storing in said read protected memory of said authentication proving device program code to carry out a verification procedure in response to a verification request, and to output a verification signal; communicating said authentication proving device—directly or indirectly via at least one further device—with said people conveyor control system; sending a verification request from said people conveyor control system to said authentication proving device; in said authentication proving device, in response to receipt of said verification request, determining a verification signal, and sending said verification signal to said people conveyor control system; and in said people conveyor control system, in response to receipt of said verification signal, selectively allowing or denying access to specific sections of said people conveyor control system and/or to specific functions implemented in said people conveyor control system.

Exemplary embodiments of the invention will be described in greater detail below taking reference to the accompanying drawings.

Figure 1:
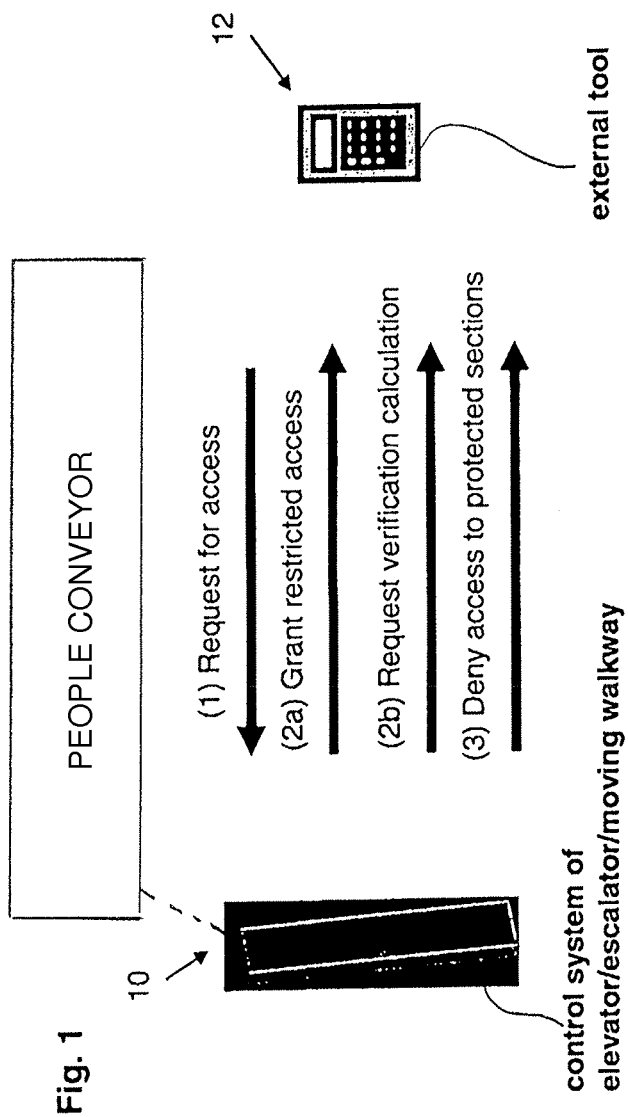
FIG. 1 shows a schematic and simplified block diagram illustrating the communications between a control system of a people conveyor and an external tool which requests access to the conveyor control system, in case the external tool is not able to carry out a verification procedure.

In all Figs. components of respective embodiments being identical or having corresponding functions are denoted by the same reference numerals. In the following description such components are described only with respect to one of the embodiments comprising such components. It is to be understood that the same description applies in respective following embodiments where the same component is included and denoted by the same reference numeral. Insofar, unless anything is stated to the contrary, it is generally referred to the corresponding description of that component in the respective earlier embodiment.

All FIGS. 1 to 4 show a schematic and simplified block diagram, respectively, illustrating the communications between a control system 10 of a people conveyor, e.g. an elevator, an escalator or a moving walkway, and an external tool 12 or 18, e.g. a maintenance tool, which requests access to the conveyor control system. In all FIGS. 1 to 4 the communications exchanged between the external tool 12 or 18 and the conveyor control system 10 are marked by bold type arrows numbered in the sequence in which the communications are exchanged.

FIG. 1 shows a case in which the external tool 12 requests access to the conveyor control system 10, in such a way that access to both a unprotected section not requiring any authentication and a protected section requiring authentication is requested, as indicated by arrow (1). Arrow (2a) indicates that access to the unprotected section is allowed by the conveyor control system 10. Before access to the protected section is allowed, the conveyor control system 10 sends a request for a verification calculation to the external tool 12. Since the external tool 12 in FIG. 1 does not include any means for carrying out the requested verification calculation, it is not able to send a correct verification signal to the conveyor control system 10. Therefore the conveyor control system denies access to the protected sections, as indicated by arrow (3).

Figure 2:
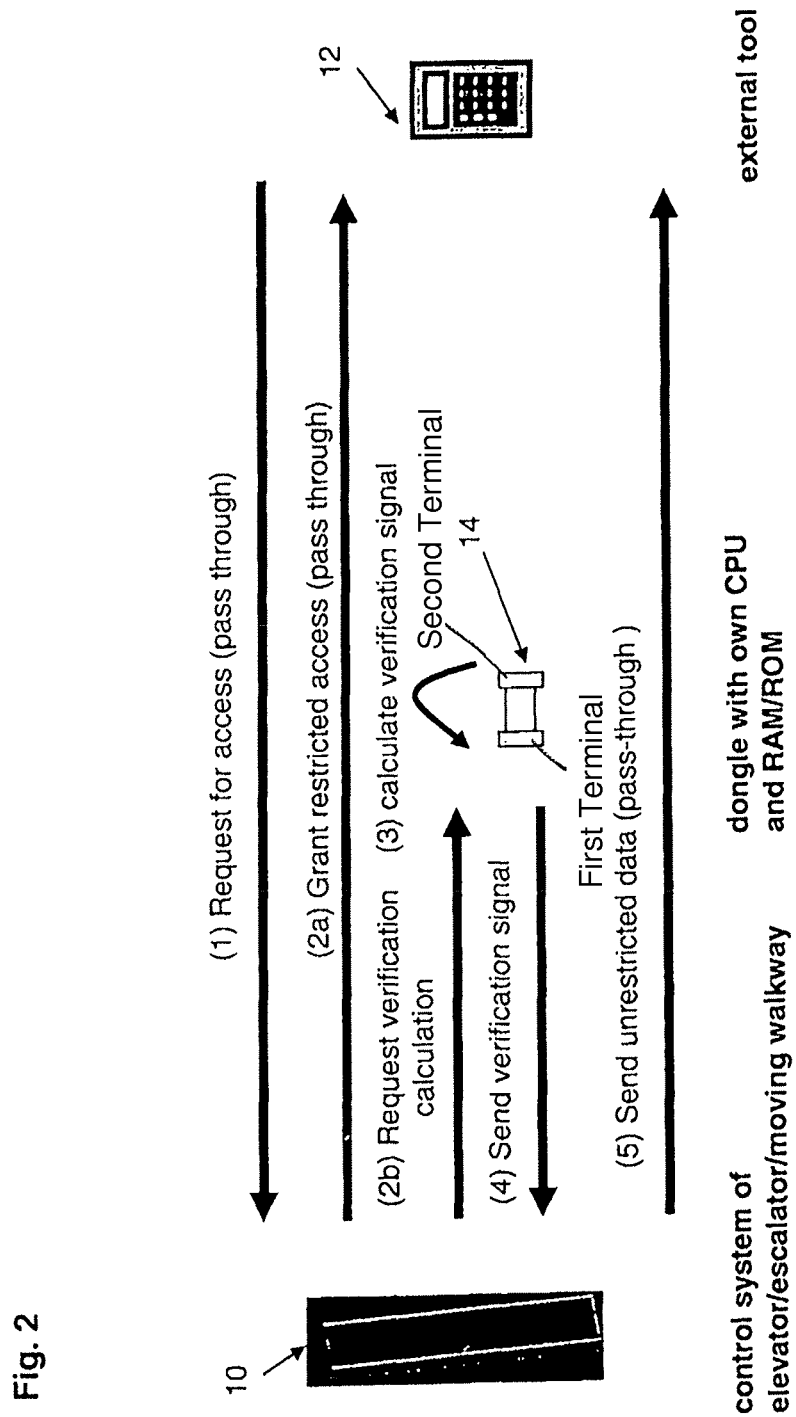
FIG. 2 shows a schematic and simplified block diagram similar to FIG. 1 illustrating the communications between a control system of a people conveyor and an external tool which requests access to the conveyor control system, wherein the external tool is connected via a pass-through dongle device to the conveyor control system.

FIG. 2 shows the same situation as FIG. 1, however, in FIG. 2 the external tool 12 (again not including any means for carrying out a verification calculation in response to a corresponding request by the conveyor control system 10) is connected to the conveyor control system 10 indirectly via a pass-through dongle device 14. This pass through dongle device may comprise a "classical" dongle having first and second terminals (e.g. in the form of USB connectors) connected in series. Other realizations of the pass-through dongle 14, e.g. in the form of a smartcard or a wireless communications device, are possible. The dongle 14 includes a processor and program code allowing the dongle 14 to monitor data being received at least at its first terminal connected to the conveyor control system 10 for the presence of a predetermined data sequence indicating that a verification calculation is requested. Techniques for including and identifying such data sequence within a stream of other data having a desired data format are known, e.g. so-called "digital water-marks" as described in U.S. Pat. No. 5,848,155 and U.S. Pat. No. 5,915, 155 can be applied. Unless receiving the predetermined data sequence, the dongle 14 will not change data being received at its first terminal, such that these data will pass the dongle 14 unchanged. Upon identification of the predetermined data sequence (indicating a request for a verification calculation as indicated by arrow (2b)), the dongle 14 will interrupt the transmission of data from the first terminal to the second terminal, and initiate the calculation of a verification signal (see arrow (3)). The verification signal will be sent back from the first terminal to the conveyor control system 10 (see arrow (4)). Upon receipt of the verification signal the conveyor control system 10 decides whether authentication was successful (in which case it will grant access, see arrow (5)), or whether further verification calculations will be necessary (in which case it will sent another request for verification calculation according to arrow (2b), and the procedure arrow (3), arrow (4) will be repeated). As the data sent from controller 10 to dongle 14, after access is granted, do not contain the predetermined sequence, these data will be passed unchanged from first terminal to second terminal of dongle 14. With respect to data received by second terminal of dongle 14 (connected to the external tool 12), it will be sufficient if dongle 14 will always pass such data unchanged to its first terminal, such that these data will be received at the conveyor control system 10 unchanged. If desired, a procedure similar to the procedure describes above with respect to data received at the first terminal can be applied.

By interconnecting the pass-through dongle 14 in between the external tool 12 and the conveyor control system 10, any older maintenance tools 12 basically not equipped for access to modern conveyor control systems 10 involving management of access to the control system according to a dedicated structure of access rights, can still be used for purpose of providing maintenance. The procedures necessary for granting access to the conveyor control system 10, and interrupting data flow, if necessary, are included in the dongle device 14.

Figure 3:
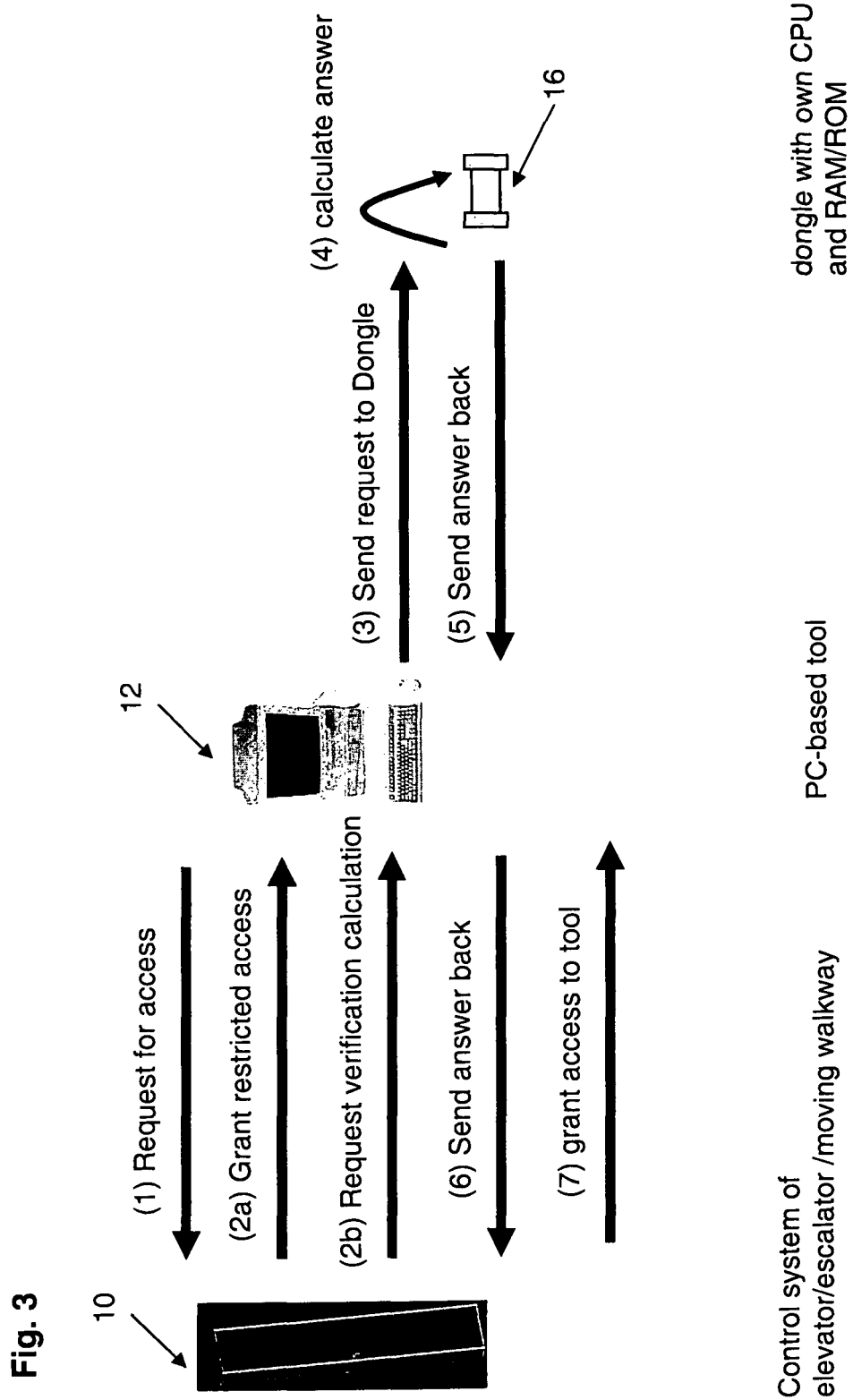
FIG. 3 shows a schematic and simplified block diagram similar to FIGS. 1 and 2 illustrating the communications between a control system of a people conveyor and an external PC based tool which requests access to the conveyor control system, wherein an add-on dongle device is connected to the external tool.

FIG. 3 shows a schematic and simplified block diagram similar to FIGS. 1 and 2 illustrating another form of use of a dongle device 16 for granting access to the control system of a people conveyor. In FIG. 3 the external tool 12 is a PC based tool (e.g. a laptop computer having implemented thereon a standard operating system), and for implementing the management of access rights, an add-on dongle device 16 is connected to the external PC-based tool 12 at a terminal different from the connection of the PC based tool 12 to the conveyor control system 10. As can be seen from FIG. 3, in case a request for a verification calculation is received by the PC based tool 12 (arrow (2b)), the PC based tool 12 redirects this request to add-on dongle device 16 (arrow (3)). The add-on dongle device 16, upon receipt of the request for verification calculation, calculates a verification signal (arrow (4)) and sends this verification signal back to the PC based tool (arrow (5)). The PC based tool 12 then redirects the verification signal to the conveyor control system (arrow (6)). Upon receipt of the verification signal the conveyor control system 10 decides whether access is granted (arrow (7)) or whether a further request for verification calculation is sent to the PC based tool 12, thereby repeating the sequence of steps according to arrows (2b), (3), (4), (5), (6). In this embodiment, the connection of the PC based tool 12 to the conveyor control system 10 remains unchanged, as the dongle device 16, necessary for performing the verification calculation does not communicate with the conveyor control system 10 directly, but does only communicate with the PC based tool 12 directly. This requires that the program code for identification of a request for calculation of a verification signal be implemented on the PC based tool 12, and not in the add-on dongle device 16. Further, the conveyor control system 10 will be implemented in such a way that no proprietary data are sent out, unless the verification procedure has been completed successfully (note that, with the embodiment in FIG. 2 in principle the conveyor control system 10 can send any proprietary data together with the request for verification calculation, since the pass-through dongle device 14 will stop transmission of any data as long as it identifies a request for verification calculation).

Also the add-on dongle device 16 of FIG. 3 can be implemented as a "classical" dongle, in the form of a smartcard, or in the form of any suitable mobile communications device.

Figure 4:
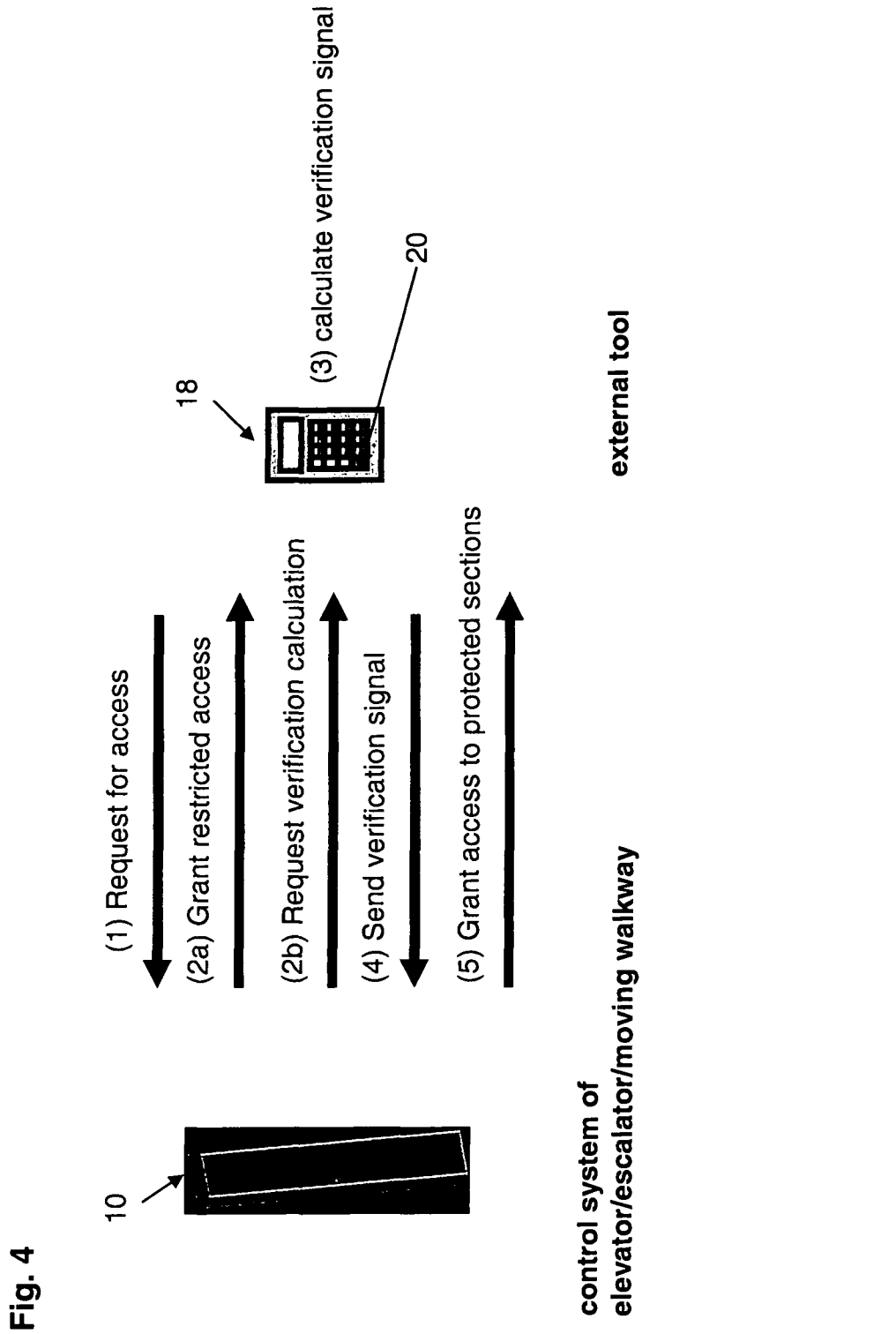
FIG. 4 shows a schematic and simplified block diagram similar to FIGS. 1 to 3 illustrating the communications between a control system of a people conveyor and an external tool which requests access to the conveyor control system, wherein the external tool comprises and authentication proving device.

FIG. 4 shows a schematic and simplified block diagram similar to FIGS. 1 to 3 illustrating the communications between a control system 10 of a people conveyor and an external tool 18 which requests access to the conveyor control system 10, wherein the external tool 18 comprises an internal authentication proving device 20. The authentication proving device 20 can have a configuration corresponding to the external pass-through dongle device 14 shown in FIG. 2 or a configuration corresponding to the external add-on dongle device 16 shown in FIG. 3.

As outlined above, the embodiments described herein allow to prevent unauthorized access to the control system of a people conveyor. Particularly with respect to known approaches such prevention of unauthorized access can be more secure, but nevertheless does not require significantly more efforts in practical use.

An exemplary embodiment of the invention provides an access control system for a people conveyor control system, comprising an authentication proving device adapted to communicate—directly or indirectly via at least one further device—with of a people conveyor control system (e.g with an I/O section thereof), the authentication proving device having a central processor unit (CPU) and a read protected memory being protected from read and write access by external applications, said authentication proving device storing in its read protected memory program code to carry out a verification procedure in response to a verification request from the people conveyor control system, and to send a verification signal to said people conveyor control system, the people conveyor control system in response to receipt of the verification signal selectively allowing or denying access to specific sections of the people conveyor control system and/or to specific functions implemented in the people conveyor control system.

Access to specific sections of the people conveyor control system may involve to read out data stored in the conveyor control system and/or to write data into the conveyor control system, even replacing existing data. Access to specific functions implemented in the people conveyor control system may involve to call specific control routines, such that these routines are carried out by the conveyor control system.

The authentication proving device may include a read protected memory in which software code is stored enabling the authentication proving device to carry out, upon receipt of a verification request, calculation of a verification response. Particularly, this protected memory may be protected against any access by external applications, i.e. against write access as well as against read access. Similarly, also the CPU of the authentication proving device may be non-accessible by any external applications, thereby forming a protected microcontroller section. Blocking of access may well be achieved by hardware, e.g. by using read and/or write protected memory circuits, and even one-time programmable memory circuits, and by restricting a data bus to communications between the protected memory and the CPU of the authentication proving device. For receipt of verification requests and output of a verification signal according to a calculated verification response, in an embodiment the authentication proving device can be provided with one or more specifically dedicated I/O ports, which I/O ports have lock functionalities, i.e. data can be put to the I/O ports from the protected memory/protected microcontroller section and/or from the conveyor control system, and data can be read from the I/O ports by the protected memory/protected microcontroller section and/or by the conveyor control system, but exchange of such data is realized via data links different from the internal data bus of the protected microcontroller section communicating the protected memory with the CPU of the authentication proving device. A number of various realizations of such concepts are readily available to skilled persons.

In an embodiment the people conveyor control system may comprise at least one microcontroller having a protected section including a CPU and at least one read protected memory (including RAM and ROM sections), and having at least one I/O section, in particular a serial I/O section and/or a wireless communications (e.g. Bluetooth or RFID) I/O section. The protected section of the microcontroller may comprise at least one cryptoprocessor, in particular an asymmetric cryptoprocessor.

In a further embodiment the request for verification may include input data from the people conveyor control system, the input data being specific for the people conveyor control system (e.g. referring to a serial number of the conveyor control system and/or conveyor installation).

In the embodiments described, the conveyor control system permits access from external devices or external applications according to an authentication procedure, i.e. the external device or external application has to provide a verification signal in response to a specific verification request. The response signal will typically involve a calculation on the basis of specific input data provided with the verification request by the conveyor control system. In case the authentication proving device comprises a cryptoprocessor, such calculation can be done in the authentication proving device, and only the verification request and the verification signal need to be communicated, if desired in encrypted form. The verification procedure may use an asymmetric encryption scheme using private and public keys.

The verification request can be determined according to specific classes of requests for access to the conveyor control system received from external devices or external applications. In this way, it is possible to manage grant of access with respect to various sections of the conveyor control system in response to specific requests for access. E.g. the conveyor control system may be adapted to grant a restricted form of access by external devices or external applications without the need of any verification procedure (such access might be access for ordinary use of the people conveyor, or access to bring the conveyor into a safe position in an emergency situation). Other forms of access, e.g. for carrying out predetermined maintenance procedures or for enabling predetermined additional operational functions of the conveyor, may only be allowed in response to receipt of a valid verification signal.

The embodiments of an access control system and corresponding access control method disclosed herein are applicable to various types of people conveyors like elevators, escalators or moving walkways.

The authentication proving device may be connectable to an external device, e.g. a portable maintenance tool, this external device being a physically external device adapted to access the conveyor control system and to manipulate data stored in the conveyor control system and/or to call functions implemented in the conveyor control system.

Data as is used in this disclosure may refer to operational parameters of the people conveyor system, among others. Maintenance functions of the conveyor control system, as is used in this disclosure, may basically refer to operational routines for carrying out specific procedures for maintenance and test purposes of the people conveyor, like calibration runs at commissioning, runs for testing braking performance, etc. Further the present disclosure may be applicable to activation and/or deactivation of so-called "add-on functions" of the people conveyor control system which enable/disable operational functionalities of a people conveyor beyond the standard operational functionalities.

The authentication proving device may be adapted to carry out, if desired with the aid of a cryptoprocessor, an asymmetric encryption/decryption procedure using private keys and public keys. Particularly, in this case the authentication proving device may store in its read protected memory at least one private key assigned to at least one public key. The public key will be available to the conveyor control system, e.g. stored in a memory of the authentication proving device that is accessible by the elevator control system for read access, or be stored in a—local or remote—database accessible by the elevator control system. Since in such asymmetric encryption/decryption procedure the private key cannot be inferred from knowledge of the public key, there is no need to protect the public key, and therefore the public key can be exchanged via any data communication path, including public networks. The private key is stored in the read protected memory only and cannot be read out from that memory.

The authentication proving device may further be adapted to carry out a so-called interactive proof authentication procedure in response to a request for verification from the people conveyor control system. An interactive proof system may be understood in the sense of an abstract machine that models computation as the exchange of messages between two parties, the verifier (in the present case the conveyor control system) and the prover (in the present case the authentication proving device). In the context of the present disclosure the conveyor control system and the authentication proving device interact by exchanging verification requests and verification signals, respectively, in order to ascertain whether a given request for access to the conveyor control system is authenticated or not. Verification requests and verification signals are sent between the conveyor control system and the authentication proving device repeatedly, until the conveyor control system has "convinced" itself that the request for access is authorized. A characteristic of such interactive approach is that for authentication purposes no direct exchange of any pass phrases is required. Rather, such pass phrases are always kept within the read protected memory of the authentication proving device.

A typical interactive proof authentication procedure may proceed as follows: in a verification request the conveyor control system requests the authentication proving device to carry out a specific calculation on the basis of input data randomly chosen by the conveyor control system, and to send the result of this calculation, included in a verification signal, back to the conveyor control system. The requested calculation is selected such that the result depends on the input data and on a specific pass phrase stored in the read protected memory of the authentication proving device. The calculation is carried out within the read protected CPU and memory of the authentication proving device. Only the result of this calculation is sent back with the verification signal from the authentication proving device to the conveyor control system. The pass phrase is not given to outside the read protected sections of the authentication proving device's CPU/memory. The conveyor control system, after receiving the verification signal, is able to verify whether the result of the calculation is correct, but is not able to infer the pass phrase from the verification signal.

When carrying out this procedure only once, depending on the difficulty of the calculation, there is a possibility that an authentication proving device not knowing the correct pass phrase nevertheless is able to produce, by accident, a correct result, and hence a verification signal that is considered true (in this case a false authorization would result). In case a difficult calculation is requested, the chance of such accidentally correct result can be close to zero, but in case of a simpler calculation this chance can be much higher. By repeating the interactive proof sequence, as described before, a plurality of times, each time using different input parameters chosen randomly, the probability of an accidentally successful authorization will decrease with increasing number of times the calculation is repeated. Therefore the number of suitable types of calculations becomes larger in case the interactive proof sequence is repeated a sufficient number of times.

In a particular embodiment the authentication proving device may be adapted to carry out a so-called zero knowledge interactive proof (ZKIP) authentication procedure in response to a request for verification from the people conveyor control system. Such zero-knowledge proof or zero-knowledge protocol may be implemented by an interactive procedure in which the authentication proving device calculates a (usually mathematical) statement, and sends the statement to the conveyor control system which proves whether this statement is true. No further information is sent to the conveyor control system than the trueness or falseness of the statement. There are several ways to implement zero knowledge interactive proof verification procedures, e.g. the ones disclosed in U.S. Pat. No. 4,748,668 (published in 1988) and U.S. Pat. No. 4,926,479 (published in 1990), the disclosure of which is incorporated herein by reference.

A particular characteristic of zero knowledge interactive proof verification procedures as described above is that no knowledge about a private sequence or private encryption key stored in the read protected memory of the authentication proving device can be inferred from the messages communicated between the conveyor control system and the authentication proving device, in particular from the verification signal, and any program code stored in the memory of the conveyor control system.

As an alternative or additional measure any other asymmetric encryption scheme, e.g. encryption and decryption of a password sequence by public and private keys, may be considered.

In an embodiment the authentication proving device may comprise a dongle device and/or a smartcard.

A dongle device as used herein may describe a physical security device (a piece of hardware) that connects in some way to the people conveyor control system and is able to carry or create any physical electronic key or transferable ID required for a specific section of the people conveyor control system to function. A dongle device according to this disclosure may connect to the people conveyor control system via a wired connection, e.g. a serial connector, or via a wireless connection, e.g. using Bluetooth or RFID techniques. It is even conceivable that such dongle devices connect to the people conveyor control system remotely via a wired or wireless network. Such network may be a public network, like the internet, or a proprietary network.

In recent time smartcards including an own central processing unit and memory have become popular to provide functions that formerly had been provided by "classical" dongles, and therefore may be regarded as dongle devices in the sense of the present disclosure. Particularly with smartcards wireless connection techniques like Bluetooth or RFID may be realized. A particular advantage of smartcards is the possibility of cost efficient manufacturing of such smartcards in large numbers, each smartcard including the required circuitry for a read/write protected microcontroller including the corresponding read/write protected memories, at prices of only few cents per smartcard. Further, the format of smartcards is ideal for being distributed among service persons.

There are conceivable some alternatives or additional components to the provision of dongle devices: E.g. in a possible embodiment a central server may be provided as an external device which builds up connection to the people conveyor control system via a wired network (public network like the internet, or proprietary network) or via a mobile communications network, once a maintenance procedure is to be carried out. The authentication proving device may be integrated in the central server or may be a device external to the server and adapted to communicate with the server and/or with the conveyor control system.

The access control system as described above allows to define a set of different access levels and/or different classes of access to the conveyor control system (e.g. routine maintenance, upgrades, overhaulings, etc.) which can each be assigned to different classes of service persons. Specific parameters of a particular installation are accessible only for the specific class of service persons that need to have access to do specific maintenance work. This can be achieved very simply by merely distributing respective dongles devices to service persons according to their different access levels and in accordance with maintenance procedures scheduled for an installation.

In an embodiment the authentication proving device may be adapted to store the information and/or data in the read protected memory in a temporally limited way. This provides for even better protection, as access rights to the conveyor control system granted once will expire after lapse of a predetermined time. This further allows to regularly update access rights with respect to service persons and installations under service.

A dongle, a smartcard or other alternatives as mentioned above, provide an easy to handle and transparent hardware solution to the complex structures of access rights. Further, dongles and particularly smart cards are efficient to produce and therefore cost effective.

The dongle device may have a first terminal connectable to a terminal of the people conveyor control system. The dongle device can simply be plugged in on-site, e.g. via USB-connection, other suitable serial connection or parallel connection, or via a smart card reading device. Alternative, the dongle device may communicate with a wireless port of the conveyor control system, e.g. a Bluetooth connection.

Further the dongle device may have a second terminal connectable to a terminal of an external device, e.g. a PC based maintenance tool.

Particularly, the external device may a portable maintenance tool, e.g. a maintenance tool based on standard PC components (typically in the form of a laptop computer or a similar portable device including a microprocessor and peripheral components). The second terminal may be connectable to a serial I/O port of the external device.

In an embodiment the first and second terminals of the dongle device may be connected in series. In this way a so called "pass through dongle device" is realized. The particular advantage of such "pass-through dongle device" is that external devices not equipped for carrying out a verification procedure and providing a verification signal in response to a conveyor control system's verification request, in particular older maintenance tools, can still be used for servicing, in case a dongle device is connected in the line connecting the maintenance tool with the conveyor control system. For purposes of the authentication procedure, the pass-through dongle device then simulates the maintenance tool, such that for the conveyor control system the situation is identical as in the case it was connected to a maintenance tool including an authentication processor. A pass-through dongle device may be constructed such that all other data communication between the external device and the conveyor control system will not be obstructed or modified, but rather pass through the dongle device.

A pass-through dongle device can further have the first terminal being of a different type than the second terminal, and thereby accommodate for different terminals of the external device and the people conveyor control system.

Alternatively, it is conceivable that the dongle device has only a first terminal, or that the dongle device has first and second terminals being connected in parallel. In this way a so-called "add-on dongle device" can be realized. Also such add-on dongle device may be useful for connecting to external devices not equipped for carrying out an authentication procedure, like older maintenance tools. In this case the external device will be connected to the conveyor control system directly, and the dongle device will be connected to a suitable terminal of the external device. The direct connection between the external device and the elevator control can be realized by way of suitable connectors (e.g. via USB, other serial connectors, parallel connectors) or wirelessly (e.g. via Bluetooth, RFID), but also in a remote form by use of any suitable networks, being wired or wireless. Such networks may be public networks, like the internet, or proprietary networks. A direct link of the dongle device to the conveyor control system is not necessary, as the external device will redirect a verification request from the conveyor control system to the dongle device, and the dongle device will send the verification signal to the external device from which it is redirected to the conveyor control system.

A principal advantage of an access control system according to the embodiments described above is the possibility of controlling, by way of handing out specific authentication proving devices to different users (e.g. service persons), a variety of different access rights to access different sections and/or levels of the conveyor control system. This can be implemented for a variety of different purposes and to a variety of very differently skilled users, e.g. service persons.

In a further particular embodiment providing the same advantages and possibilities as outlined above, a method for controlling access to a people conveyor control system is provided, comprising the steps of providing an authentication proving device having a central processor unit (CPU) and a read protected memory being protected from read and write access by external applications; storing in the read protected memory of the authentication proving device program code to carry out a verification procedure in response to a verification request, and to output a verification signal; communicating the authentication proving device—directly or indirectly via at least one further device—with the people conveyor control system; sending a verification request from the people conveyor control system to the authentication proving device; in the authentication proving device, in response to receipt of the verification request, determining a verification signal, and sending the verification signal to the people conveyor control system; and in the people conveyor control system, in response to receipt of the verification signal, selectively allowing or denying access to specific sections of the people conveyor control system and/or to specific functions implemented in the people conveyor control system.

While the invention has been described with reference to exemplary embodiments, it will be understood by those skilled in the art that various changes may be made and equivalents may be substituted for elements thereof without departing from the scope of the invention. In addition, many modifications may be made to adapt the particular situation or material to the teachings of the invention without departing from the essential scope thereof. Therefore it is intended that the invention not be limited to the particular embodiments disclosed, but that the invention will include all embodiments falling within the scope of the appended claims.

The invention claimed is:

1. Access control system for a people conveyor control system, comprising
    an authentication proving device that communicates with a people conveyor control system;
    said authentication proving device having a central processor unit and a read protected memory being protected from read and write access by external applications;
    said authentication proving device storing in its read protected memory program code to carry out a verification procedure in response to a verification request from said people conveyor control system, and to send a verification signal to said people conveyor control system;
    said people conveyor control system in response to said verification signal selectively allowing or denying access to at least one of specific sections of said people conveyor control system and specific functions implemented in said people conveyor control system.

2. Access control system according to claim 1, wherein said people conveyor is an elevator, an escalator or a moving walkway.

3. Access control system according to claim 1, wherein said authentication proving device is connectable to an external device, said external device accessing said elevator control system for manipulating at least one of data stored in said elevator control system and call functions implemented in said elevator control system.

4. Access control system according to claim 3, wherein said external device is a portable maintenance tool.

5. Access control system according to claim 1, wherein said authentication proving device carries out an asymmetric authentication procedure using private keys and public keys, said authentication proving device storing in its read protected memory at least one private key.

6. Access control system according to claim 1, wherein said authentication proving device carries out an interactive proof authentication procedure in response to a request for verification from said elevator control system.

7. Access control system according to claim 6, wherein said authentication proving device carries out a zero knowledge interactive proof authentication procedure in response to a request for verification from said elevator control system.

8. Access control system according to claim 1, wherein said authentication proving device deletes at least one of said information and data stored in said read protected memory after a lapse of a predetermined amount of time.

9. Access control system according to claim 1, wherein said authentication proving device comprises a dongle device.

10. Access control system according to claim 9, wherein said dongle device has a first terminal connectable to a terminal of said people conveyor control system or to a terminal of an external device.

11. Access control system according to claim 10, wherein said first terminal is connectable to a serial I/O port of said people conveyor control system or to a serial I/O port of said external device.

12. Access control system according to claim 9, wherein said dongle device has a first terminal connectable to a terminal of said people conveyor control system and a second terminal connectable to a terminal of an external device.

13. Access control system according to claim 12, wherein said second terminal is connectable to a serial I/O port of said external device.

14. Access control system according to claim 12, wherein said first and second terminals are connected in series.

15. Access control system according to claim 12, wherein said first and second terminals are connected in parallel.

16. Access control system according to claim 1, wherein said authentication proving device is located remotely from said conveyor control system.

17. A method for controlling access to a people conveyor control system, comprising the steps:
    providing an authentication proving device having a central processor unit and a read protected memory being protected from read and write access by external applications;
    storing in said read protected memory of said authentication proving device program code to carry out a verification procedure in response to a verification request, and to output a verification signal;
    sending a verification request from said people conveyor control system to said authentication proving device;
    in said authentication proving device, in response to said verification request, determining a verification signal, and sending said verification signal to said people conveyor control system;
    in said people conveyor control system, in response to said verification signal, selectively allowing or denying access to at least one of specific sections of said people conveyor control system and specific functions implemented in said people conveyor control system.

* * * * *

UNITED STATES PATENT AND TRADEMARK OFFICE
CERTIFICATE OF CORRECTION

| | | |
|---|---|---|
| PATENT NO. | : 8,770,350 B2 | Page 1 of 1 |
| APPLICATION NO. | : 13/140536 | |
| DATED | : July 8, 2014 | |
| INVENTOR(S) | : Wilke et al. | |

It is certified that error appears in the above-identified patent and that said Letters Patent is hereby corrected as shown below:

On the title page, item [75]
Third inventor
delete "Hans-Killan Spielbauer" and insert --Hans-Kilian Spielbauer--

Signed and Sealed this
Fourth Day of November, 2014

Michelle K. Lee
*Deputy Director of the United States Patent and Trademark Office*